United States Patent [19]

Zijderhand et al.

[11] Patent Number: 5,488,611
[45] Date of Patent: Jan. 30, 1996

[54] METHOD AND ARRANGEMENT FOR DATA TRANSMISSION

[75] Inventors: Frans Zijderhand, Eindhoven, Netherlands; Alfred L. M. Weling, Nürnberg, Germany

[73] Assignee: U.S. Philips Corporation, New York, N.Y.

[21] Appl. No.: 909,899

[22] Filed: Jul. 7, 1992

[30] Foreign Application Priority Data

Jul. 8, 1991 [EP] European Pat. Off. ............. 91201768

[51] Int. Cl.⁶ ..................................................... H04J 3/26
[52] U.S. Cl. ..................... 370/108; 370/105.2; 455/54.2
[58] Field of Search ................................ 370/104.1, 100, 370/95.3, 95.2, 105.5, 107, 108, 103, 100.1, 101, 105, 105.1, 105.2, 105.3, 95.1; 455/54.1, 67.6, 54.2, 58.2, 31.1, 51.1, 51.2, 13.2, 17, 18, 67.1; 375/107, 109, 111, 114, 118

[56] References Cited

U.S. PATENT DOCUMENTS

| | | | |
|---|---|---|---|
| 4,472,802 | 9/1984 | Pin et al. | 370/95.3 |
| 4,513,416 | 4/1985 | Fujiwara | 370/104.1 |
| 4,573,207 | 2/1986 | Smith et al. | 455/58.2 |
| 4,607,257 | 8/1986 | Noguchi | 455/13.2 |
| 4,642,806 | 2/1987 | Hewitt et al. | 370/103 |
| 4,672,608 | 6/1987 | Ball et al. | 370/93 |
| 4,761,799 | 8/1988 | Arragon | 370/103 |
| 4,827,474 | 5/1989 | Le Goffic et al. | 370/104.1 |

OTHER PUBLICATIONS

"Computer Networks", A. S. Tanenbaum, Prentice/Hall International Editions, Chapter 6, pp. 249–277.
"Mobile Information Systems", J. Walker–Editor, pp. 86–95.

Primary Examiner—Douglas W. Olms
Assistant Examiner—Huy D. Vu
Attorney, Agent, or Firm—Anne E. Barschall

[57] ABSTRACT

A communication protocol is proposed, to be used by a main station and a plurality of mobile sub-stations, while time slots are used in which data packets are transmitted. A sub-station that has a message to be sent to the main station first transmits a request-for-access data packet to the main station. If the sub-station knows its own position as well as that of the main station, the sub-station applies an advancement of time to the request-for-access data packet, so that this may be longer and contain more information, such as a self-selected recognition code and/or information relating to the length of the message to be sent.

The main station measures the instant at which the request-for-access data packet is received relative to the time slot distribution and sends a correction of the advancement of time to the sub-station.

After a send permission has been granted, the data packets are transmitted with a length essentially corresponding to that of the time slots, so that more information can be transmitted per data packet.

15 Claims, 3 Drawing Sheets

METHOD AND ARRANGEMENT FOR DATA TRANSMISSION

BACKGROUND OF THE INVENTION

The invention relates to a method of transmitting data from a plurality of mobile sub-stations to a stationary main station by way of a common channel which is subdivided into time slots the length synchronization of the substations being determined by a corresponding time slot distribution of a data transmission signal transmitted by the main station. Data packets have a time length essentially equal to the time length $t_S$ of the time slots and are transmitted by the sub-station slightly earlier than the beginning of the relevant time slot. The "advancement of time" is selected in such a way that the data packets, when received by the main station, are substantially synchronized with the time slot distribution of the main station.

A method of this type is used, for example, in a vehicle communication system. It may then relate to a communication system arranged for data exchange among vehicles, in which the communication is effected by way of the main station then acting as an information relay station. The communication system may also be arranged, for example, as a traffic navigation system, in which the main station provides the vehicles with traffic information.

The communication path from the main station to the sub-stations will henceforth be called the downlink, whereas the communication path from the sub-stations to the main station will henceforth be called the uplink. The carrier frequency used for the downlink differs from the carrier frequency used for the uplink and is continuously monitored by all the active sub-stations.

A problem for such a communication system relates to the fact that the distance from each mobile substation to the main station is variable, as a result of which the degree of synchronization of the uplink time slot distribution relative to the downlink time slot distribution may decrease. Consequently, messages may get lost, or termed differently, the user efficiency of the communication channel (denoted by the English term of throughput and expressed in the number of data bits received correctly via a communication channel per second divided by the maximum number of data bits that can be transmitted per second via that communication channel) may be reduced.

U.S. Pat. No. 4,472,802 has disclosed solving this problem by permitting the main station to determine the time delay with which a message sent by a sub-station is received, and inform that sub-station of this time delay so that the sub-station sends its messages with a time delay and so that the messages are received within one time slot by the main station. However, this known principle has a drawback of at least three time slot periods getting lost before the messages are sent with the desired advancement of time by the sub-station.

SUMMARY OF THE INVENTION

It is an object of the invention to provide such a method with improved throughput of the communication channel.

More specifically, it is an object of the invention to provide a method of data transmission in which there is always a proper synchronization of the uplink with the downlink, while the number of data bits per data packet is increased and the probability of a correct reception of data packets is enhanced.

For this purpose, a method of above type according to the invention is characterized, in that a first, request-for-access data packet of a different configuration from that of the actual data packets is transmitted prior to the actual data packets of the message, in that the length t(1) of the first, request-for-access data packet satisfies $$t(1) < t_S - 2t_{D,max}$$

where $t_S$ is the time length of the time slots, and $t_{D,max}$ is the maximum time delay that may occur in the coverage area of the main station concerned, and in that during transmission, the beginning of the first, request-for-access data packet substantially coincides with the beginning of a time slot in the sub-station, in that the main station is arranged for measuring the time $t_B$ that elapses in this time slot until the beginning of the reception of the first, request-for-access data packet, in that the main station is arranged for sending a code representative of $t_B$ to the relevant sub-station, and in that each sub-station is arranged for transmitting in response to the code representative of $t_B$ the message data packets with an advancement of time $t_A$ equal to tB and a length t(x) substantially equal to $t_S$.

BRIEF DESCRIPTION OF THE DRAWING

In the following the invention will be further explained by the description of a preferred embodiment of the method according to the invention while reference is made to the drawing. In this drawing the respective Figures show in.

DETAILED DESCRIPTION OF THE PREFERRED EMBODIMENTS

Figure 1:
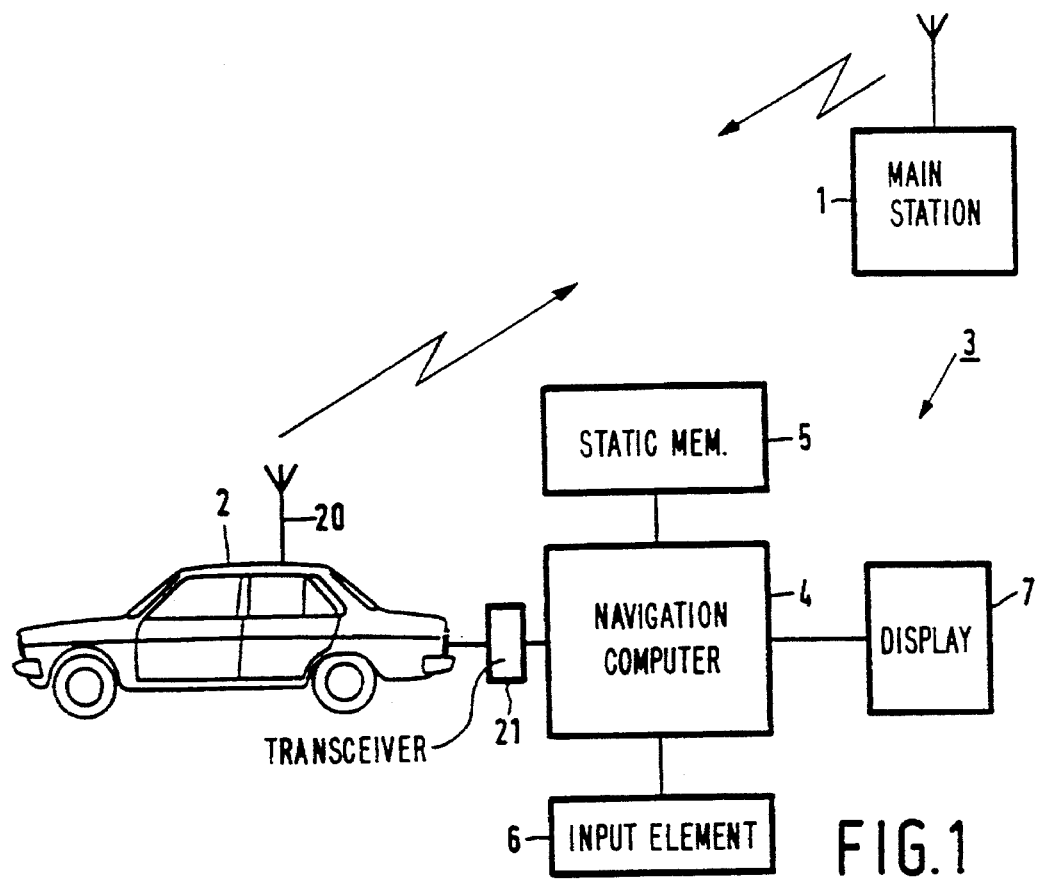
FIG. 1 a diagrammatic representation of a main station and a sub-station.

The invention is pre-eminently suitable for use in a traffic navigation system known per se and will therefore, unless stated otherwise, be discussed hereinafter by way of illustrative example in conjunction with a traffic navigation system in which a main station 1 continuously transmits navigation information to a plurality of vehicles 2 located in a coverage area of the main station 1. A single vehicle is represented in FIG. 1. The vehicles each comprise a sub-station 3 with a navigation computer 4. The navigation computer 4, which is represented outside the vehicle 2 for clarity in FIG. 1, but is generally naturally on board the vehicle 2, comprises a static memory 5, for example a CD ROM, in which basic data are stored relating to the road system in at least the coverage area. Furthermore, the navigation computer 4 comprises an input element 6, for example a keyboard, by which a user may input data relating to, for example, his point of departure and his destination. On the basis of, for example, the point of departure, the destination and the basic data of the road system stored in the memory 5, the navigation computer 4 computes the route to be followed and informs the user of this route via a display device 7. The display device 7 may comprise, for example, a picture screen and/or a loudspeaker through which instructions may be given to the user.

Auxiliary information is transmitted by the main station 1 by way of the downlink. The auxiliary information relates to situations differing from the situations stored in the memory 5. An example of such a different situation may be a road closed to traffic due to an accident or works, or a newly opened road. Another example is the situation in which there is a traffic backup on a specific road.

Although it is possible to arrange the traffic navigation system in such a way that a sub-station 3 announces its point of departure and its destination to the main station 1, and that the main station 1 on the basis of this information transmits to this sub-station 3 only the auxiliary information relevant to that sub-station 3, this is not desired in practice. The major reason for this is the protection of privacy of the users of the traffic navigation system, that is to say, the drivers of the vehicles 2. Therefore, said auxiliary information is transmitted as information available to any user. For receiving the auxiliary information, each substation 3 has an aerial 20 and a transceiver 21 for transferring the received information to the navigation computer 4 and transmitting the information provided by the navigation computer. In the navigation computer 4 of the vehicle 2 it is then determined which auxiliary information relates to the route to be followed by that vehicle 2 and, possibly, the route to be followed is adapted to the current situation.

A limiting factor for the reliability of such a traffic navigation system is the speed at which such auxiliary information is adapted to changing current situations. For example, when there is an accident it is important for the auxiliary information to be adapted immediately, on the one hand, for the other road users to avoid delay and, on the other hand, generally for avoiding traffic backup being formed on the road, so that emergency services can reach the place of the accident very fast.

For improving the reliability of the described prior-art traffic navigation system, according to an important aspect of the present traffic navigation system, each sub-station 3 transmits to the main station 1 information regarding the accessibility of a section just covered by the vehicle 2 concerned. This information about the accessibility of the section generally relates to the average speed with which a specific section can be covered but may also relate to, for example, the temperature in connection with the chance of black ice.

In order to send its message, the sub-station first requests access to the uplink. This is done on the basis of the so-called contention principle as is known in the protocol under the name of slotted ALOHA, which is described, for example in the book entitled "Computer Networks" by Andrew S. Tanenbaum, Prentice/Hall International Editions, Chapter 6, p. 253 ff. For this purpose, the sub-station sends a first data packet in a specific time slot by the uplink to the main station. If the main station correctly receives this first data packet it will announce the correct reception to the sub-station in a manner to be described hereinafter.

The main station 1 is arranged for detecting whether a received data packet is received correctly or in a disturbed. An example of disturbed reception is in the case where two sub-stations transmit a data packet in the same time slot. For the detection of correct or disturbed reception, each data packet may comprise check bits.

By way of illustration there will now be a brief description of such detection. If the main station 1 does not detect any signal strength of the uplink carrier frequency in a specific time slot, the main station deduces that none of the sub-stations has transmitted a data packet in this time slot. If the main station 1 does detect signal strength of the uplink carrier frequency in a specific time slot, the main station 1 performs a check procedure with the aid of the check bits. Depending on the result of this check procedure the main station deduces whether the data packet has been received correctly or not.

It should be observed that the data contents of the data packet do not play any role in such a check, in other words, the above applies to all the data packets to be transmitted.

Figure 2:
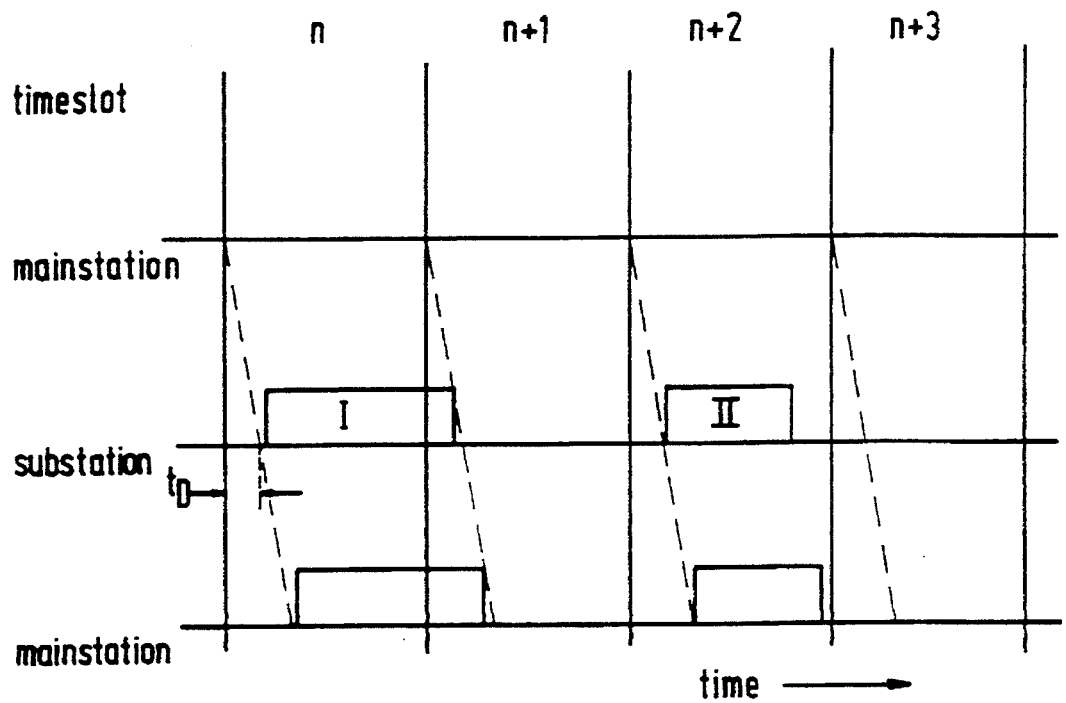
FIG. 2 a time diagram of uplink signals in illustration of the prior art technique.

A factor which plays a role in the data transfer by way of the uplink is the distance between the sub-stations and the main station, which distance is variable due to the mobile nature of the sub-stations. As a result of this distance there is a time difference between the instant at which the main station transmits a time slot synchronization signal and the instant at which the sub-station receives this time slot synchronization signal, as is illustrated in FIG. 2. FIG. 2 illustrates by way of dashed lines that the time slot distribution in the main station has shifted by a specific delay $2_D$ relative to the time slot distribution in the main station shown in exaggerated form in FIG. 2 for clarity, which delay $t_D$ is equal to the delay of a communication signal going from the main station to the sub-station. A data packet I transmitted in the time slot n by the sub-station thus arrives at the main station with a delay. When the length of the data packet I in essence corresponds to that of the time slots, it is even possible for the "tail" of the data packet to be received by the main station at the beginning of the next time slot n+1. The result of this is, on the one hand, that the data packet I is not fully received by the main station in said time slot n, whereas, on the other hand, the data packet I is partly received in an unintended time slot n+1. In neither time slot will the main station detect a correct reception, while the data packet has rendered two time slots useless for actual data transfer.

A solution to this problem could be that the time length of the data packets is selected considerably shorter than the time length of the time slots, so that each data packet is always received by the main station certainly within one time slot (see FIG. 2 data packet II which is completely received by the main station within the time slot n+2). However, this solution is undesirable, because it implies a reduction of the throughput of the communication channel. The time actually used for data transfer is then considerably shorter than the available time.

The invention proposes a solution that does not have this drawback. According to the invention, a first, request-for-access data packet having a different configuration and time duration from the actual data packets is transmitted preceding the actual data packets of the message. In this first, request-for-access data packet, the sub-station may send data relating to the message to be transmitted to the main station, as will be described hereinafter. The actual data packets are transmitted by the sub-station slightly earlier than the beginning of the relevant time slot and have a time length which is substantially equal to the time length of the time slots. The difference $t_A$ between the initial send instant and the beginning of the relevant time slot, herein termed "advancement of time", is selected such that the data packets, when received by the main station, are substantially synchronized with the time slot distribution in the main station. This difference is thus co-determined by the main station on the basis of the reception of the first, request-for-access data packet.

Figure 3:
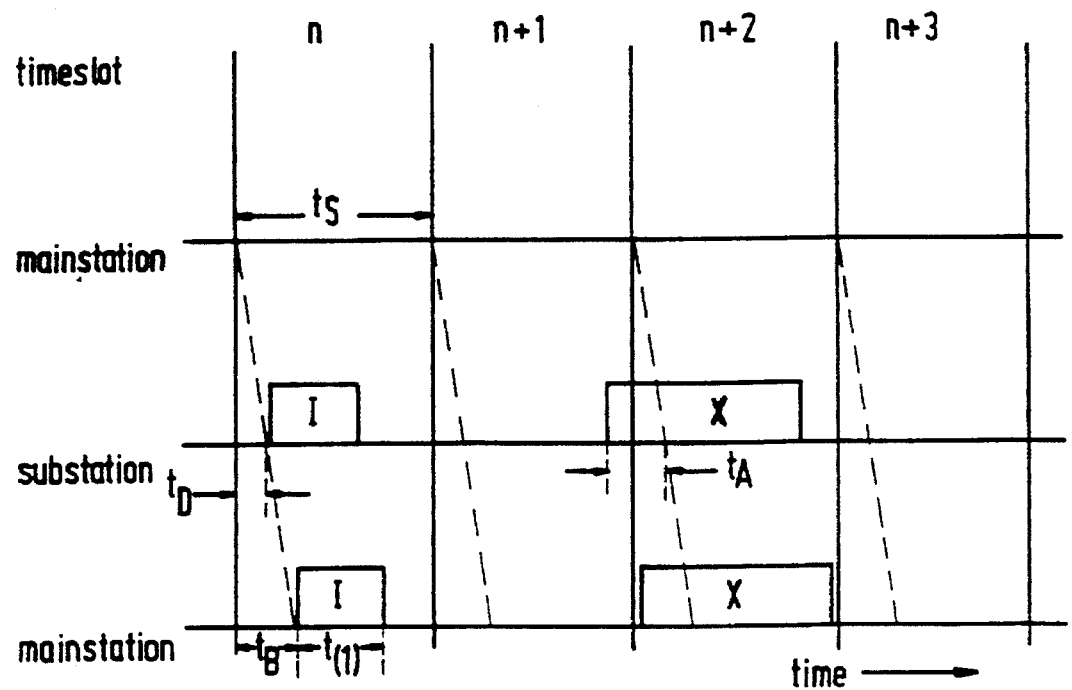
FIG. 3 a time diagram of uplink signals according to the invention for the case where the sub-station does not know its own position and/or that of the main station.

FIG. 3 illustrates an embodiment of this solution according to the invention, which is pre-eminently suitable for use in a situation in which a sub-station does not know its own position and/or that of the main station. In a specific time slot n the sub-station transmits a first, request-for-access data packet I to the main station. The beginning of this first, request-for-access data packet substantially coincides with the beginning of the time slot n. The length t(1) of the first, request-for-access data packet is relatively small, and satisfies $$t(1) < t_S - 2t_{D,max} \qquad (1)$$

where $t_S$ is the time length of the time slots, and $t_{D,max}$ is the maximum time delay that may occur in the coverage area of the main station concerned. $t_{D,max}$ may be approximated by $$t_{D,max} = R_{max}/c \qquad (2)$$

where $R_{max}$ is the maximum possible distance between the sub-station and the main station in the coverage area of the main station, and c is the velocity of propagation of the communication waves.

As appears from FIG. 3, the first, request-for-access data packet is received by the main station completely within the time slot n.

According to the invention the main station is arranged for measuring the time $t_B$ elapsing in the time slot n until the beginning of the first, request-for-access data packet is received. Furthermore, according to the invention the main station is arranged for co-transmitting a code representative of $t_B$ together with the acknowledgement of reception which acknowledgement is to be further described below and relates to the first, request-for-access data packet. The signal for this acknowledgement of reception is not represented in FIG. 3 for clarity. It should be observed that the exact way in which $t_B$ is coded in the acknowledgement of reception is not important for a proper understanding and implementation of the invention, so that this will not be described in further detail.

In addition, according to the invention each sub-station is arranged for transmitting, in response to the code representative of $t_B$, the message data packets with an advancement of time $t_A = t_B$ and a length $t(x) \approx t_S$, as is shown in the time slot n+2 in FIG. 3. As is clearly noticeable from this drawing Figure the message data packets, when received by the main station, are very well synchronized with the time slot distribution of the main station and the throughput of the communication channel is improved because there is optimum utilization of each time slot and because not more than two time slot periods (n and n+1) are lost before the sub-station transmits its data packets with the desired advancement of time $t_A$.

In a further embodiment of the invention each sub-station is arranged for individually computing the advancement of time $t_A$ of the data packets. It is then assumed that the sub-station knows its own current geographical position as well as that of the main station. Therefore, this embodiment is pre-eminently suitable for use in a traffic navigation system of the type described hereinbefore. In the case where the invention is used in a traffic navigation system, the sub-station may determine its own position by way of a system known per se in which satellite communication is utilized. The advancement of time $t_A$ is then computed by the sub-station on the basis of the formula $$t_A = 2R/c \qquad (3)$$

where R is the current distance between sub-station and main station. In practice, $t_A$ will preferably be selected to be slightly smaller than the value as computed with the aid of the formula (3) so as to reduce the probability of overlap as a result of inaccuracies in distance and/or advancement of time.

In practice, however, the communication waves in the sub-station and main station may happen not to travel the shortest distance (line of sight), for example, because this connection is impeded by an obstacle such as a building or a mountain. Communication is then effected in that the communication waves reflect once or several times from objects such as a building or a mountain due to which the travel time of the communication waves is longer than would be expected on the basis of formula (3). In this case the actual travel time of the communication waves is thus unknown.

Figure 4:
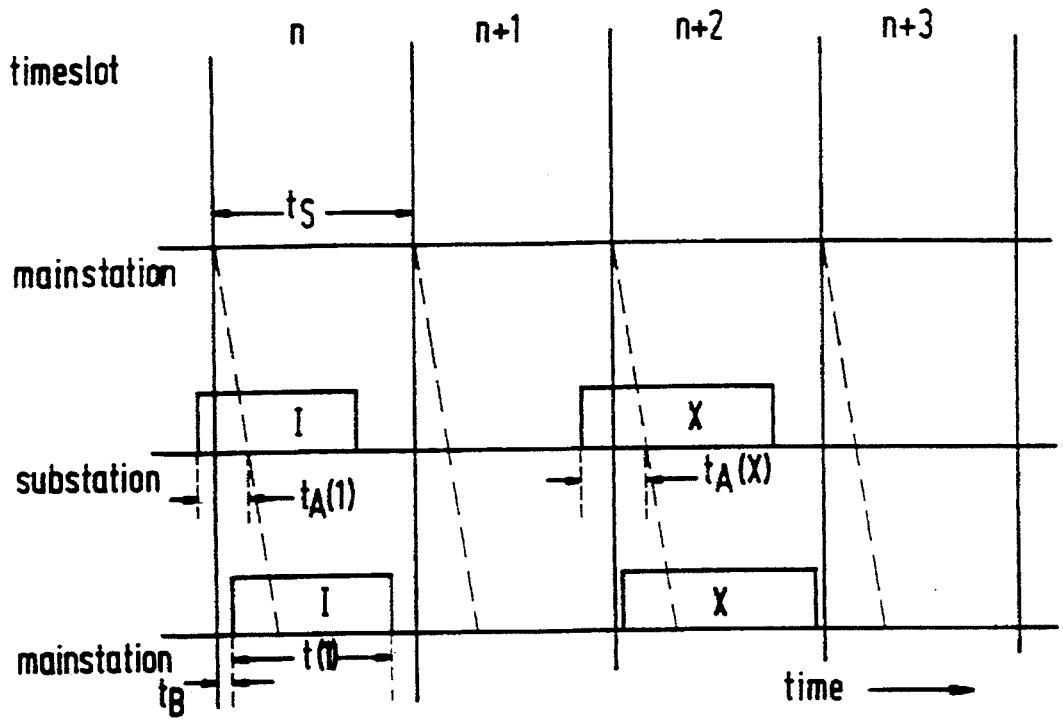
FIG. 4 a time diagram of uplink signals according to the invention for the case where the sub-station knows its own position as well as that of the main station.

FIG. 4 illustrates a solution to this problem which solution is in accordance with a preferred embodiment of the invention. A sub-station is then arranged for computing the advancement of time $t_A(1)$ of the first request-for-access data packet I according to formula (3). It should be observed that the actually occurring travel time of the communication waves will not be shorter than the thus computed value of $t_A(1)$. Furthermore, the time length t(1) of the first, request-for-access data packet satisfies the formula $$t(1) = t_S - t_r \qquad (4)$$

where $t_r$ is a correction term representing the time difference caused by reflections, if any. In an exemplary embodiment in which $R_{max}$ is about 35 km, $t_r$ may be about 40 μs.

FIG. 4 distinctly shows that the first, request-for-access data packet I is certainly received by the main station in the time slot n.

In a comparable manner to the one described above relating to the embodiment illustrated with reference to FIG. 3, the main station is arranged for measuring the time $t_B$ that elapses in the time slot n until the beginning of the first, request-for-access data packet is received, and announcing this time $t_B$ to the sub-station.

Furthermore, in this embodiment each sub-station is arranged for transmitting, in response to the code representative of $t_B$, the message data packets with an additional advancement of time equal to $t_B$ and a length $t(x) \approx t_S$, as is shown in the time slot n+2 in FIG. 4. This additional time difference $t_B$ will be relatively small and may be considered the required correction of the computed advancement of time due to reflections. This means that the advancement of time $t_A(x)$ of the message data packets satisfies $$t_A(x) = t_A(1) + t_B \qquad (5)$$

As is clearly noticeable from FIG. 4, the message data packets are very well synchronized with the time slot distribution of the main station when received by the main station and the throughput of the communication channel is improved because each time slot has optimum utilization. Furthermore, an improvement relative to the embodiment illustrated in FIG. 3 is obtained in that the time length of the first, request-for-access data packet has increased, so that this is capable of containing more information as will be clarified hereinbelow.

After the first, request-for-access data packet has been correctly received, the main station reserves a plurality of time slots for exclusive use by the sub-station concerned. They may be, for example, successive time slots. The main advantage of reserving time slots for exclusive use by one sub-station is that the data packets of this sub-station do not run the risk of colliding with data packets from other sub-stations, so that the probability of correct reception is increased and thus the uplink throughput is improved. In an embodiment of the invention the first, request-for-access data packet contains information relating to the number of data packets in the message to be sent by the sub-station. The number of time slots to be reserved is determined on the basis of that information. Therefore, it is advantageous to transmit a first, request-for-access data packet with an advancement of time computed by the sub-station, because in that case the time length of this data packet may be greater, so that more information can be co-transmitted with this data packet.

As has already been observed, the communication from sub-station to main station and vice versa is desired to take place on the basis of anonymity. Therefore, there is a problem of how the main station can give one specific sub-station permission to transmit, while imposing on the remaining sub-stations a prohibition to transmit. A possible solution is based on the supposition that if there is correct reception of a request-for-access data packet, it is obvious that only a single sub-station transmitted, because all the further sub-stations did not transmit. In that case a general permission may be transmitted, which is then only valid for the sub-station that transmitted, whereas all the other sub-stations are arranged for interpreting the general permission as a prohibition because they did not transmit. This solution will be described in more detail in a patent application filed concurrently with the present application by the same applicants.

Due to various circumstances which are unimportant for a proper understanding of the invention and will therefore not be discussed any further, it may happen, however, that a plurality of sub-stations request for access simultaneously and that the main station interprets the two request-for-access data packets as correct packets. If in that case a general permission were transmitted, the two relevant sub-stations would transmit message packets simultaneously, which packets would then certainly collide and deteriorate the throughput of the uplink. In order to avoid this situation it is desired to refer to one specific sub-station when permission is granted. This desire seems to be contrary to aforesaid desire that communication from the sub-station to the main station and vice versa take place on the basis of anonymity. This problem is solved in a further preferred embodiment according to the invention in that each sub-station is arranged for sending a random personal recognition code as information in the first request-for-access data packet. The main station is then arranged for repeating this recognition code when the permission to transmit is sent out. Since there is only a slim chance that two different sub-stations will both select the same recognition code, the sent permission will most probably be interpreted as such by only one sub-station.

It should be emphasized in this respect that the recognition code selected by the sub-station is a random code and that it is not possible to actually identify the sub-station by means of said code. The words "recognition code" are merely intended to mean that a sub-station recognizes the code repeated by the main station.

A configuration of the first, request-for-access data packet and message data packets respectively, which are specifically suitable for use in the method according to the invention will now be discussed with reference to the drawing FIGS. 5A–C.

Figure 5A:
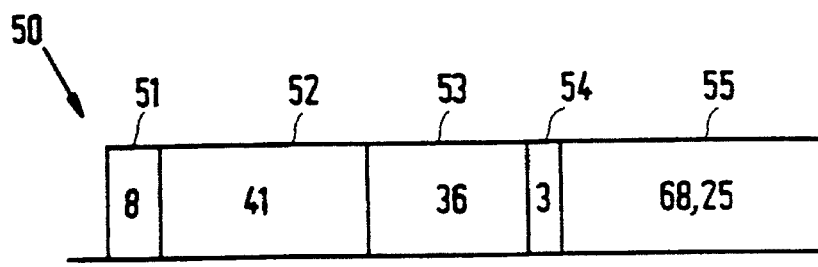
FIGS. 5A to 5C configurations of data packets which can be used for the present invention.

FIG. 5A shows the configuration of a request-for-access data packet 50 as this is known per se in the GSM system (Groupe Special Mobile). This packet 50 comprises a section 41 with 8 tail bits, a section 52 with 51 synchronization sequence bits, a section 53 with 36 message bits, a section 54 with 3 tail bits, followed by a safety margin 55. The safety margin 55 at the end of this configuration is relatively large (68.25 bits) to ensure that this packet always fits in a time slot irrespective of the location of the mobile sub-station, that is to say, that the distance from the mobile sub-station to the main station may vary between 0 and 35 km. This configuration is suitable for use in a request-for-access data packet in the embodiment discussed with reference to FIG. 3 in which the sub-station does not know its own location.

Figure 5B:
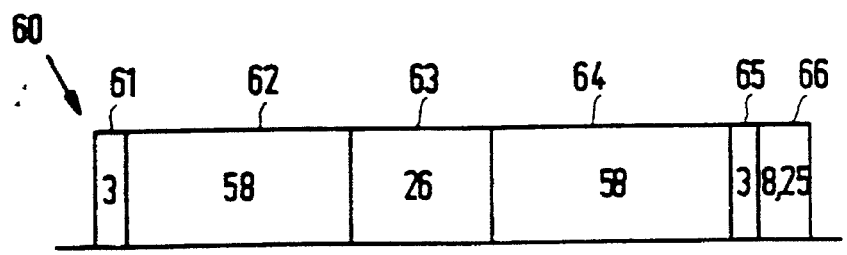

FIG. 5B shows the configuration of a message data packet 60 as this is known per se in the GSM system, which configuration is only suitable if the sub-station knows its advancement of time. This packet 60 comprises a section 61 with 3 tail bits, a section 62 with 58 message bits, a section 63 with 26 training bits, a section 64 with 58 message bits, a section 65 with 3 tail bits, followed by a safety margin 66. The safety margin 66 at the end of this configuration is relatively small (8.25 bits), because it only needs to set off minor inaccuracies, if any, in the communication signal delay, for example, as a result of a movement of the mobile sub-station. This configuration is suitable for use in a message data packet in the method according to the invention.

Figure 5C:
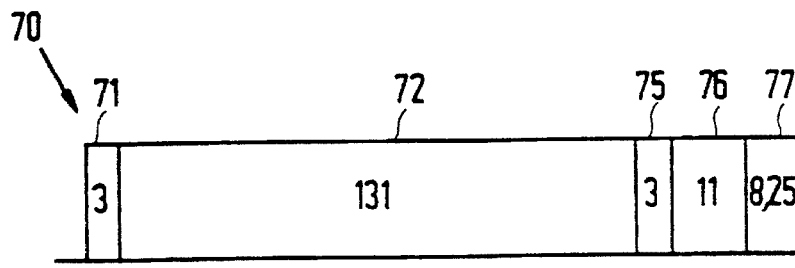

FIG. 5C shows the configuration of a request-for-access data packet 70 with tail bit sections 71 and 75, of which data packet 70 the length of the safety margin 76, 77 lies between that of above safety margins 55 and 66. In addition to the small, normal safety margin 77 of 8.25 bits for setting off minor inaccuracies in the communication signal delay, this data packet 70 has an additional safety margin 76 for setting off any differences in the communication signal delays caused by various reflections. In the example discussed above, in which such a safety margin 76 is about 40 μs, this corresponds to 11 bits in the GSM system. Compared to the relatively large safety margin (68.25 bits) of the configuration shown in FIG. 5A, there is thus a gain of 49 bits. The configuration of FIG. 5C, with a section 72 of 131 message bits (inclusive of the training bits) is suitable for use in a request-for-access data packet in the embodiment discussed with reference to FIG. 4 in which the sub-station does know its own location.

Figure 6:
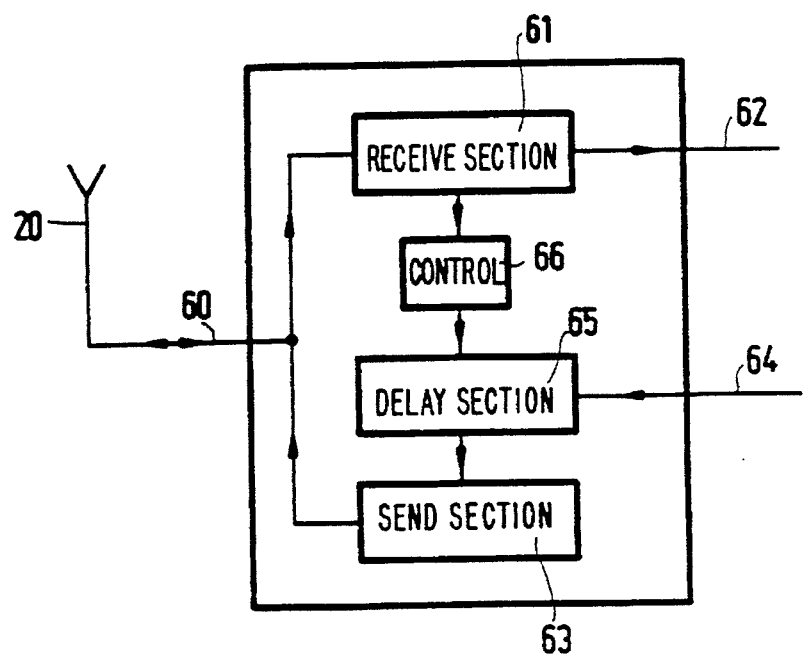
FIG. 6 a block diagram of an exemplary embodiment of a sub-station.

FIG. 6 shows a detailed block diagram of an exemplary embodiment of a sub-station which may be used in the communication system according to the invention, both in the case where this sub-station comprises a navigation computer and in the case where the communication system is not specifically used in traffic navigation. The sub-station is coupled to the transceiver aerial 20 by way of a connection 60. The received signals are applied to a receive section 61 which transfers the received signals to a connection 62 for further processing, for example, by a navigation computer. The data to be transmitted are fed via a connection 64 to an adjustable delay section 65 by which the delayed signals are transported to a send section 63 which conveys the data to be transmitted to the aerial 60 by way of connection 60. The delay of the section 65 is adjusted by a control unit 66 which can receive signals from the receive section 61. When a request-for-access data packet is transmitted, the delay of section 65 is set at t=0. Once the code that is representative of $t_B$ has been received by the receive section 61, this code is recognized by the control unit 66 which adjusts the delay $t_A$ for section 65 on the basis of this code, so that the subsequent data packets are transmitted with the desired delay of $t_A$. Once the complete message has been sent, the delay section may be reset, so that a next request-for-access data packet will be transmitted without a delay.

It will be evident to the export that it is possible to change or modify the represented embodiment of the method according to the invention without distracting from the inventive idea or scope of protection of the invention.

We claim:

1. Method of transmitting data packets from any of a plurality of anonymous mobile sub-stations to a stationary main station via a common channel subdivided into time slots whose length and synchronization are determined by a corresponding time slot distribution of a data transmission signal transmitted by the main station, said data packets having a length essentially equal to the time length, $t_S$, of the time slots, comprising the steps:

(a) prior to transmitting the data packets, any one of the plurality of anonymous sub-stations first transmits a request-for-access packet which has a different configuration from that of the data packet, said request-for-access packet being substantially shorter than $t_S$ and beginning substantially at the beginning of a time slot, (b) upon receiving said request-for-access packet, the main station determines the time, $t_B$ that elapses during said time slot from the beginning of the time slot to the time of receipt within the time slot, of the request-for-access packet, (c) the main station then transmits a signal representative of said time, $t_B$, to the sub-station, (d) said sub-station in response to receipt of the time, $t_B$ transmits its data packets with an advancement-of-time, $t_A$, and a length, $t(x)$, where $t_A = t_B$, $t(x)$ substantially equals $t_S$ and advancement-of-time means that the data packets are transmitted slightly before the start of a time slot such that the data packets when received by the main station are substantially synchronized with the time slot distribution of the main station.

2. The method of claim 1, wherein the length, $t(x)$, of the request-for-access packet satisfies the formula:

$$t(x) < t_S - 2t_{D,max},$$

where $t_{D,max}$ is the maximum time delay that may occur in the coverage area of the main station.

3. Method as claimed in claim 2, characterized in that the maximum delay $t_{D,max}$ is approximated with the aid of the formula $$t_{D,max} = R_{max}/c$$

where $R_{max}$ is the maximum possible distance between the sub-station and the main station in the coverage area of the main station, and c is the velocity of propagation of the communication waves.

4. Method of transmitting data packets from any of a plurality of anonymous mobile sub-stations to a stationary main station via a common channel subdivided into time slots whose length and synchronization are determined by a corresponding time slot distribution of a data transmission signal transmitted by the main station, said data packets having a length essentially equal to the time length, $t_S$, of the time slots, comprising the steps:

(a) prior to transmitting the data packets, any one of the plurality of anonymous substations first transmits a request-for-access packet which has a different configuration from that of the data packet, said request-for-access packet being substantially shorter than $t_S$, (b) said sub-station determines its location relative to the main station, and then determines an advancement-of-time, $t_A(1)$, for transmitting its request-for-access packet with respect to a time slot, (c) upon receiving said request-for-access packet, the main station determines the time, $t_B$, that elapses during said time slot from the beginning of the time slot to the time of receipt within the time slot, of the request-for-access packet, (d) the main station then transmits a signal representative of said time, $t_B$, to the sub-station, (e) said sub-station then transmitting its data packets with an advancement-of-time, $t_A(x)$, and a length, $t(x)$, where $t_A(x)$ is related to the current distance, R, of the sub-station to the main station and to the advancement-of-time, $t_A(1)$, $t(x)$ substantially equals $t_S$, and advancement-of-time means that the data packets are transmitted slightly before the start of a time slot such that the data packets when received by the main station are substantially synchronized with the time slot distribution of the main station.

5. The method of claim 4, wherein the length, $t(x)$, of the request-for-access packet satisfies the formula:

$$t(x) < t_S - t_r,$$

where $t_r$ is a correction term representing the time difference caused by reflections.

6. The method of claim 5, wherein the advancement-of-time, $t_A(1)$, is computed using the formula:

$$t_A(1) = 2R/c,$$

where c is the velocity of propagation of communication waves.

7. The method of claim 6, wherein the advancement-of-time $t_A(x) = t_A(1) + t_B$.

8. Method as claimed in claim 4, characterized in that the advancement of time $t_A(1)$ of the first data packet is computed by the sub-station with the aid of the formula $$t_A(1) = 2R/c$$

where R is the current distance between sub-station and main station, in that the time length $t(x)$ of the first data packet satisfies the formula $$t(x) = t_S - t_r,$$

where $t_r$ is a correction term representing the time difference caused by reflections, if any, in that the main station is arranged for measuring the time $t_B$ that elapses in the relevant time slot until the beginning of the first, request-for-access data packet is received, in that the main station is arranged for sending a code representative of $t_B$ to the sub-station concerned, in that each sub-station is arranged for transmitting in response to the code representative of $t_B$ the message data packets with a length $t(x)$ substantially equal to $t_S$, and an advancement of time $t_A(x)$ which satisfies $$t_A(x) = t_A(1) + t_B.$$

9. Method as claimed in claim 8, characterized in that $t_r$ is about 40 μs.

10. Method as claimed in claim 1 or claim 4, characterized in that the first, request-for-access data packet contains a random recognition code selected by the relevant sub-station itself, and in that the main station is arranged for repeating this recognition code when the permission to transmit is sent out.

11. Method as claimed in claim 1 or claim 4, characterized in that the first, request-for-access data packet contains information relating to the plurality of data packets in the message to be sent by the sub-station.

12. Method as claimed in claim 11, characterized in that the main station reserves a plurality of time slots for exclusive use by the relevant sub-station on the basis of said information relating to the plurality of data packets in the message to be sent by the sub-station.

13. Communication system for transmitting data packets from any of a plurality of anonymous mobile sub-stations to a stationary main station via length and time slot a common channel subdivided into time slots whose synchronization are determined by a corresponding distribution of a data transmission signal transmitted by the main station, said data packets having a length essentially equal to the time length, $t_S$, of the time slots, comprising:

(a) means in the sub-station for, prior to transmitting the data packets, first transmitting a request-for-access packet which has a different configuration from that of the data packet, said request-for-access packet being substantially shorter than $t_S$ and beginning substantially at the beginning of the time slot, (b) means in the main station for, upon receiving said request-for-access packet, determining a time, $t_B$, that elapses during said time slot from the beginning of the time slot to the time of receipt within the time slot, of the request-for-access packet, (c) means in the main station for transmitting a signal representative of said time, $t_B$, to the sub-station, (d) means in said sub-station, in response to receipt of the time, $t_B$, transmitting its data packets with an advancement- of time, $t_A$, and a length, $t(x)$, where $t_A = t_B$, $t(x)$ substantially equals $t_S$, and advancement-of-time means that the data packets are transmitted slightly before the start of a time slot such that the data packets when received by the main station are substantially synchronized with the time slot distribution of the main station.

14. System for transmitting data packets from any of a plurality of anonymous mobile sub-stations to a stationary main station via a common channel subdivided into time slots whose length and synchronization are determined by a corresponding time slot distribution of a data transmission signal transmitted by the main station, said data packets having a length essentially equal to the time length, $t_S$, of the time slots, comprising:

(a) means in said sub-stations for, prior to transmitting the data packets, first transmitting a request-for-access packet which has a different configuration from that of the data packets, said request-for-access packet being substantially shorter than $t_S$ and beginning substantially at the beginning of the time slot, (b) means in the main station for, upon receiving said request-for-access packet, determining a time, $t_B$, that elapses during said time slot from the beginning of the time slot to the time of receipt within the time slot, of the request-for-access packet, (c) means in the main station for transmitting a signal representative of said time, $t_B$, to the sub-station, (d) means in said sub-stations for determining a current distance R between the sub-station and the main station transmitting its data packets with an advancement-of-time, $t_A$, with respect to a time slot, (e) means in said sub-station for then transmitting its data packets with said advancement-of-time, $t_A$, and a length, $t(x)$, where $t_A$ is related to the current distance, R, of the sub-station to the main station and to $t_B$, $t(x)$ substantially equals $t_S$, and advancement-of-time means that the data packets are transmitted slightly before the start of a time slot such that the data packets when received by the main station are substantially synchronized with the time slot distribution of the main station.

15. In a system for transmitting data packets from any of a plurality of anonymous mobile sub-stations to a stationary main station via a common channel subdivided into time slots whose length and synchronization are determined by a corresponding time slot distribution of a data transmission signal transmitted by the main station, said data packets having a length essentially equal to the time length, $t_S$, of the time slots, comprising:

(a) said sub-stations having means for, prior to transmitting the data packets, first transmitting a request-for-access packet which has a different configuration from that of the data packet, said request-for-access packet being substantially shorter than $t_S$, (b) said sub-stations having means for determining its respective location relative to the main station and for determining an advancement-of-time, $t_A$, for transmitting its request-for-access packets with respect to a time slot, (c) means in the main station for, upon receiving said request-for-access packet, determining a time, $t_B$, that elapses during said time slot from the beginning of the time slot to the time of receipt within the time slot, of the request-for-access packet, (d) means in the main station for transmitting a signal representative of said time, $t_B$, to the sub-station, (e) said sub-station having means for then transmitting its data packets with said advancement-of-time, $t_A$, and a length, $t(x)$, where $t_A$ is related to the current distance, R, of the sub-station to the main station and to $t_B$, $t(x)$ substantially equals $t_S$, and advancement-of-time means that the data packets are transmitted slightly before the start of a time slot such that the data packets when received by the main station are substantially synchronized with the time slot distribution of the main station.

\* \* \* \* \*